United States Patent Office 3,413,110
Patented Nov. 26, 1968

3,413,110
METHOD AND COMPOSITION FOR CONTROLLING GROWTH OF SUCKERS IN TOBACCO
Walter W. Puckette, Rte. 1, Gladys, Va. 24554
No Drawing. Continuation-in-part of application Ser No. 365,140, May 4, 1964. This application Aug. 24, 1965, Ser. No. 482,298
2 Claims. (Cl. 71—78)

ABSTRACT OF THE DISCLOSURE

A composition for application to growing suckers in tobacco plants, so as to inhibit sucker growth without damaging the plant.

---

This application is a continuation-in-part of applicant's coopending application Ser. No. 365,140, filed May 4 1964, now abandoned and entitled, Method and Composition for Controlling Growth of Suckers in Tabacco.

The present invention relates generally to a method and composition for controlling the growth of suckers in plants, and particularly in tobacco.

Numerous previous inventors have attempted to regulate the growth of suckers in tobacco, tomato and similar plants. Daughety (U.S. Patent No. 2,098,135) has developed a composition including lubricating oil, linseed oil, creosote oil and fuel oil which is applied to suckers in order to inhibit their growth without damaging the plant, salt being employed merely as a filler. A principal shortcoming of such a composition is the killing effect of the gasoline and creosote which accumulate at the plant stalk base and cause rotting. Other inventors, in an attempt to eliminate the onerous manual labor involved in actually "pinching off" the suckers as a control, have developed a number of commercial sucker-killers such as MH–30 manufactured by Nettituck Rubber Company of Cambridge, Mass. which is sprayed upon the tobacco plants and absorbed into both the suckers and leaves. Although such spray compositions stop the growth of suckers, residue is contained in the stalk and leaf which seriously affects the flavor and quality and, thus, the commercial value of the cured leaf.

According to the present invention, the six or seven thousand tobacco plants that are in an acre of cultivation may be controlled without periodic manual "pinching off" of the individual suckers from the plants by direct application of the present composition to the suckers in the area between the stalk and the three topmost leaves of the plant. Applicant's composition is permitted to zig-zag from leaf to leaf down the stalk and, yet, is removed from the base of the stalk by its detergent ingredient action with subsequent dew or rain.

Accordingly, it is an object of the present invention to provide composition for controlling plant sucker growth while eliminating manual labor in large part.

Another object of the present invention is to provide compositions for controlling sucker growth without damaging the tobacco plant.

A first composition prepared in accordance with the present invention includes the following formulation:

| | |
|---|---|
| Mineral oil | gallons__ 1 |
| Kerosene | pints__ 1 |
| Salt | pounds__ 1 |
| Liquid detergent (such as trademarked Joy, Whiz and the like) | ounces__ 6 |
| Water | gallons__ 1 |
| Carbon tetrachloride | ounces__ 4 |
| Gum arabic | do____ 4 |

The resultant mixture is shaken and then applied one and a half teaspoons to each individual tobacco plant. The composition is not applied before development of the bloom when the plants are white in the bud. Rather, the composition is applied when the plant is in a growing state, not suffering from drought, when 25 to 50% of the blooms have opened and the suckers at the plant stalk and leaf are one to one and one-half inches long. Normally, the three top leaves at this stage of growth are about six to eight inches long. The tobacco stalk should not be too hard before the bloom is broken and applicant's composition is applied, but just hard enough so that the bloom will break off the stalk without splintering up. The composition is applied to the sucker at the point of stalk and leaf intersection with one-half teaspoon to the suckers adjacent each of the three top leaves. Then, the composition is permitted to zig-zag down the stalk from leaf intersection to leaf intersection. The composition should be applied after the dew has left the tobacco plant in the morning by means of a pre-set mechanical topper or hand oiler. Then the detergent takes subsequent action after the next dew or rain. The detergent also serves, of course, as an emulsifier in the mixing of the mineral oil, kerosene and water. The mineral oil serves as a carrier of the other liquid ingredients, as a filler and as a killer. The salt and kerosene when combined with the mineral oil provide a complete sucker killer. Mineral oil by itself will only partially kill suckers or inhibit sucker growth temporarily, before the suckers recommence growing.

A second composition prepared in accordance with the present invention includes the following formulation:

| | |
|---|---|
| Water | gallons__ 1 |
| Kerosene | pints__ 1 |
| Salt | pounds__ ½ |
| Dry instant starch | ounces__ 12 |
| Carbon tetrachloride | do____ 4 |

As will be apparent, in the second composition mineral oil is omitted. Experimentation has shown that mineral oil used in excess often has a deleterious rotting effect upon plants. Also, the cost of using large quantities of mineral oil may be prohibitive. Accordingly, the second composition employs water as a carrier while ordinary corn starch is used as a thickener to hold the composition upon the suckers for the requisite period of time, as well as insuring that the formula will adhere to the plants regardless of weather conditions. Enhancement of the mixing of oil and water is achieved with the use of carbon tetrachloride, which also serves as an extra killer. Gum arabic is employed for the purpose of mixing the oil and water to form an elulsion. Finally, nitrate of soda and mineral oil may be used. Although not included in the above formulation, depending on desired killing power.

A third composition prepared in accordance with the present invention includes the following formulation:

| | |
|---|---|
| Water | gallons__ 1 |
| Liquid detergent | ounces__ 4–6 |
| Carbon tetrachloride | do____ 12–16 |
| Dry instant starch | do____ 12 |

Importantly, in the third composition carbon tetrachloride is employed exclusively as agent for effectively killing the suckers. This composition is applied to the top of the plant in a liberal amount so as to kill the suckers as it zig-zags to the bottom of the stalk.

It is recommended that the second and third compositions be applied a second time about 10 days to two weeks after initial application. By the time the suckers reappear, all the tobacco will be harvested.

Manifestly, variation in formulation of the entire mixture may be undertaken without departing from the spirit and scope of the present invention defined in the subjoined claims.

I claim:
1. A method for controlling growth of suckers in tobacco comprising:
   (A) addressing the tobacco plant when 25 to 50% of the blooms have opened and there are ½ to 1-inch suckers between the plant stalks and leaves;
   (B) selecting a plurality of top leaves;
   (C) applying at the point of leaf intersection with stalk ½ teaspoon to the suckers of each of said plurality of top leaves of a liquid composition including water, liquid detergent, carbon tetrachloride and dry instant starch; and
   (D) permitting the composition to pass down the stalk from leaf intersection to leaf intersection.
2. A composition for controlling the growth of suckers in tobacco, comprising the following ingredients, substantially in the proportions specified: water (1 gallon); liquid detergent (4–6 ounces); carbon tetrachloride (12–16 ounces) and dry instant starch (12 ounces).

References Cited

UNITED STATES PATENTS

| | | | |
|---|---|---|---|
| 2,098,135 | 11/1937 | Daughety | 71—2.7 |
| 2,403,435 | 7/1946 | Hammer | 71—126 |
| 2,720,451 | 11/1955 | Anderson et al. | 71—2.1 |
| 2,746,853 | 5/1956 | Yowell et al. | 71—2.7 |
| 2,772,152 | 11/1956 | Edmond et al. | 71—2.7 |
| 2,957,834 | 10/1960 | Moller et al. | 260—17.2 |
| 3,004,056 | 10/1961 | Nunn et al. | 260—461 |
| 3,006,751 | 10/1961 | Brugmann et al. | 71—78 |
| 3,129,529 | 4/1964 | Rumsey | 47—2 |
| 3,193,373 | 7/1965 | Parups | 71—2.1 |

FOREIGN PATENTS 851,250  10/1960  Great Britain.

LEWIS GOTTS, *Primary Examiner.*

G. HOLLRAH, *Assistant Examiner.*